(12) United States Patent
Nakashima et al.

(10) Patent No.: US 10,003,177 B2
(45) Date of Patent: *Jun. 19, 2018

(54) CURING MATERIAL, WIRE HARNESS, AND MANUFACTURING METHOD THEREOF

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP); KYUSHU UNIVERSITY, Fukuoka-shi, Fukuoka (JP)

(72) Inventors: Kazuo Nakashima, Yokkaichi (JP); Tatsuya Hase, Yokkaichi (JP); Yoshihito Kato, Yokkaichi (JP); Makoto Mizoguchi, Chikuchino (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, Fukuoka (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 14/758,709

(22) PCT Filed: Sep. 24, 2013

(86) PCT No.: PCT/JP2013/075673
§ 371 (c)(1),
(2) Date: Jun. 30, 2015

(87) PCT Pub. No.: WO2014/112157
PCT Pub. Date: Jul. 24, 2014

(65) Prior Publication Data
US 2015/0340848 A1 Nov. 26, 2015

(30) Foreign Application Priority Data
Jan. 16, 2013 (JP) .................................. 2013-005356

(51) Int. Cl.
| | |
|---|---|
| H02G 1/00 | (2006.01) |
| H02G 3/04 | (2006.01) |
| H01B 13/16 | (2006.01) |
| H01B 13/00 | (2006.01) |
| H01B 7/282 | (2006.01) |
| H02G 15/18 | (2006.01) |
| H02G 15/00 | (2006.01) |
| H02G 15/04 | (2006.01) |
| C08F 290/06 | (2006.01) |
| C08G 18/48 | (2006.01) |
| C08G 18/73 | (2006.01) |

(Continued)

(52) U.S. Cl.
CPC .......... H02G 1/00 (2013.01); C08F 290/067 (2013.01); C08G 18/4825 (2013.01); C08G 18/73 (2013.01); C09D 175/16 (2013.01); H01B 7/282 (2013.01); H01B 13/003 (2013.01); H01B 13/16 (2013.01); H02G 3/0406 (2013.01); H02G 15/003 (2013.01); H02G 15/043 (2013.01); H02G 15/18 (2013.01); *H01R 4/22* (2013.01)

(58) Field of Classification Search
CPC . C08F 209/067; C08G 18/4825; C08G 18/73; C09D 175/16; H01B 13/003; H01B 13/16; H01B 7/282; H02G 1/00; H02G 15/0406; H02G 15/118
USPC ........................................................ 522/96
See application file for complete search history.

(56) References Cited

U.S. PATENT DOCUMENTS

| 6,531,522 B1 * | 3/2003 | Winningham ........ C03C 25/106 427/508 |
|---|---|---|
| 2002/0137846 A1 | 9/2002 | Fink et al. |

(Continued)

FOREIGN PATENT DOCUMENTS

| CN | 102031071 A | 4/2011 |
|---|---|---|
| JP | 2002-317090 A | 10/2002 |

(Continued)

OTHER PUBLICATIONS

Aug. 31, 2016 Office Action issued in Chinese application No. 201380070684.6.

(Continued)

*Primary Examiner* — Sanza McClendon
(74) *Attorney, Agent, or Firm* — Oliff PLC (57) ABSTRACT

A curing material, having a solubility parameter of 9.4 or more, contains at least a chain transfer agent that contains a compound containing a polyether structure and two or more urethane bonds or two or more urea bonds in a molecule, and a metal-containing compound. A wire harness is manufactured by supplying the curing material to a conductor exposed portion of a wire bundle including a plurality of bundled insulated wires each having a conductor covered with a covering material made of an insulating body, the conductor exposed portion being formed by removing a part of the covering material of the wire bundle to expose the conductor inside; and curing the curing material by irradiating light in a state in which a surface of the curing material is covered with a protective member formed from a resin containing a plasticizer and having light transmissivity, thereby forming a waterproof portion.

12 Claims, 5 Drawing Sheets

(51) Int. Cl.
*C09D 175/16* (2006.01)
*H01R 4/22* (2006.01)

(56) References Cited

U.S. PATENT DOCUMENTS

| | | | | |
|---|---|---|---|---|
| 2007/0100039 A1* | 5/2007 | Hancock, Jr. | ......... | C08F 283/00 |
| | | | | 524/186 |
| 2011/0038593 A1* | 2/2011 | Chien | ................ | C03C 25/1065 |
| | | | | 385/141 |
| 2013/0338327 A1* | 12/2013 | Hase | ......................... | C08F 2/38 |
| | | | | 526/282 |
| 2014/0004341 A1* | 1/2014 | Moroishi | ........... | C08G 18/5096 |
| | | | | 428/354 |

FOREIGN PATENT DOCUMENTS

| | | | |
|---|---|---|---|
| JP | 2003329860 A | * | 11/2003 |
| WO | 2011065310 A1 | | 6/2011 |
| WO | 2012/102299 A1 | | 8/2012 |
| WO | 2013/125516 A1 | | 8/2013 |

OTHER PUBLICATIONS

Nov. 12, 2013 Search Report issued in International Patent Application No. PCT/JP2013/075673.

* cited by examiner

CURING MATERIAL, WIRE HARNESS, AND MANUFACTURING METHOD THEREOF

TECHNICAL FIELD

The present invention relates to a curing material, a wire harness, and a manufacturing method thereof, and more particularly relates to a curing material used as an adhesive material, a coating material, a sealing material, a molding material or the like of an automobile component, an electrical/electronic device, an aircraft component and the like, a wire harness that uses the curing material as a waterproofing agent and is mounted to an automobile and the like, and a manufacturing method of the wire harness.

BACKGROUND ART

Self-cohesive tapes and the like are formed by laminating a layer of a pressure-sensitive adhesive (cohesive) on a support body of a soft polyvinyl chloride resin. The soft polyvinyl chloride resin is obtained by adding a plasticizer to a polyvinyl chloride resin. When the resin component contains a plasticizer as in this case, there is the problem that the plasticizer migrates to the adhesive layer that is used in contact with the soft polyvinyl chloride resin. The migration of the plasticizer to the adhesive layer results in a reduction in the adhesive strength, giving rise to the problem of detachment and the like.

Therefore, in order to solve the above-described problem, an adhesive is known in which the plasticizer is prevented from migrating from the soft polyvinyl chloride resin to the adhesive layer (see, e.g., Patent Document 1).

The adhesive described in Patent Document 1 is composed of a curing resin containing 40 mass % or more of polyacrylate containing C1-C18 alkyl(meth)acrylate, polyalkyl vinyl ether, a photo-polymerization initiator, and so forth.

Conventionally, in the case of connecting the wires of a wire harness routed in an automobile, the insulating coverings of the wires are removed to expose the core wires, and the exposed portions of the core wires are connected by means of welding, soldering or a crimping terminal to form a spliced portion. When the wire harness including this spliced portion is routed along an engine compartment and the bottom surface of a vehicle, which are areas subjected to water, the entry of water into the spliced portion causes corrosion of the core wires and the crimping terminal and also results in the entry of water into the connectors at the wire ends via gaps between the core wires. For this reason, conventionally, waterproofing with a resin has been performed on the above-described spliced portion.

As the resin used for the above-described waterproofing, a liquid resin is used from the viewpoint of ease of application and handleability. The liquid resin is applied to the spliced portion so as to be soaked therein, and is cured to maintain the shape. In terms of the curing mechanism, the waterproofing resins can be grouped into a thermosetting type, a two-part reactive curing type, a moisture curing type, and a photo-curing type, for example. Among the aforementioned resins, a photo-curing resin, in particular, an ultraviolet curing resin is often used as the waterproofing resin because of its short curing time and ease of the process.

CITATION LIST

Patent Documents

Patent Documents 1: JP 2002-317090A

SUMMARY OF INVENTION

Technical Problem

However, even though it is a UV-curable curing material, the composition of the adhesive described in Patent Document 1 above needs to be melted at high temperature at the time of use because it is a hot-melt adhesive.

When an ultraviolet curing resin is used for the above-described waterproofing, ultraviolet radiation does not reach, for example, the gaps between the bundled wires of the wire harness and the gaps in the bundled conductor portions exposed to the outside, and the resin remains uncured, resulting in the problem that a sufficient waterproofing performance may not be achieved. There is another problem that the plasticizer in the polyvinyl chloride resin (PVC), which is used as the wire covering material, migrates to the resin and causes a reduction in the adhesive strength.

A problem that the present invention is to solve is to provide a curing material that does not need to be melted at high temperature, can inhibit the migration of the plasticizer, and is curable in a short period of time. The present invention also provides a wire harness having a good waterproofing performance by achieving sufficient curing at a location where irradiation light does not reach the waterproofing agent and inhibiting the migration of the plasticizer to the resin, and a manufacturing method thereof.

Solution to Problem

In order to solve the above-described problems, a curing material according to the present invention is a curing material containing at least a chain transfer agent, wherein the chain transfer agent contains a compound (a) containing a polyether structure and two or more urethane bonds or two or more urea bonds in a molecule, and a metal-containing compound (b), the curing material has a solubility parameter of 9.4 or more, and, when the curing material is used in an application in which the curing material is in contact with a resin containing a plasticizer, the plasticizer can be inhibited from migrating to the curing material.

Preferably, in the curing material, the curing material is a photo-curing material, and has a dark-area curability of being susceptible to curing by the chain transfer agent in a portion that irradiation light does not reach.

Preferably, in the curing material, the polyether structure (a) has three or more oxygen atoms.

Preferably, in the curing material, the metal-containing compound (b) is a compound containing at least one metal selected from tin, copper, zinc, cobalt, and nickel.

Preferably, in the curing material, the resin containing the plasticizer is one selected from a polyvinyl chloride resin, an acrylic resin, a polyurethane resin, a polyolefin resin, a phenol resin, and a polyamide resin.

A wire harness according to the present invention is a wire harness that uses a cured product of the above-described curing material.

Furthermore, a wire harness according to the present invention is a wire harness that uses a cured product of the above-described curing material as a waterproofing agent, including a wire bundle including a plurality of bundled insulated wires each having a conductor covered with a covering material made of an insulating body, a conductor exposed portion formed by removing a part of the covering material to expose the conductor inside being covered with the waterproofing agent, and a waterproof portion formed by covering a surface of the waterproofing agent with a light-transmissive protective member, the protective member being a resin containing a plasticizer, and the plasticizer of the protective member can be inhibited from migrating to the waterproofing agent.

A wire harness manufacturing method according to the present invention is a wire harness manufacturing method including: supplying the above-described curing material to a conductor exposed portion of a wire bundle including a plurality of bundled insulated wires each having a conductor covered with a covering material made of an insulating body, the conductor exposed portion being formed by removing a part of the covering material of the wire bundle to expose the conductor inside; and curing the curing material by irradiating light in a state in which a surface of the curing material is covered with a protective member formed from a resin containing a plasticizer and having light transmissivity, thereby forming a waterproof portion.

Preferably, in the wire harness manufacturing method, the protective member is a sheet or a tube formed from one selected from a polyvinyl chloride resin, an acrylic resin, a polyurethane resin, a polyolefin resin, a phenol resin, and a polyamide resin.

Advantageous Effects of Invention

The curing material according to the present invention has a solubility parameter of 9.4 or more, and thus can inhibit the plasticizer in the resin from migrating from the resin containing the plasticizer in contact with the curing material into the curing material. Furthermore, since the curing material contains the chain transfer agent, it can be cured at room temperature in a short period of time, for example, by irradiation of ultraviolet radiation or the like.

Since the wire harness according to the present invention uses the above-described curing material, even the covering material of a wire or the like is in a state, for example, in which the resin containing the plasticizer is in contact with the cured product of the curing material, the plasticizer can be inhibited from migrating to the cured product. Accordingly, the physical properties of the cured product of the curing material will not be reduced, making it possible to maintain favorable properties for a long period.

Furthermore, since a conductor exposed portion formed by removing a part of the covering material of the wire bundle to expose the conductor inside is covered with the waterproofing agent, a waterproof portion formed by covering a surface of the waterproofing agent with a light-transmissive protective member is provided, and the protective member is a resin containing a plasticizer, the wire harness that uses the cured product of the above-described curing material according to the present invention as the waterproofing agent can suppress the migration of the plasticizer of the protective member to the waterproofing agent, thus achieving a good waterproofing performance.

The wire harness manufacturing method according to the present invention has adopted a method including: supplying the above-described curing material to a conductor exposed portion of a wire bundle including a plurality of bundled insulated wires each having a conductor covered with a covering material made of an insulating body, the conductor exposed portion being formed by removing a part of the covering material of the wire bundle to expose the conductor inside; and curing the curing material by irradiating light in a state in which a surface of the curing material is covered with a protective member formed from a resin containing a plasticizer and having light transmissivity, thereby forming a waterproof portion. Accordingly, it is possible to provide the above-described wire harness having a good waterproofing performance.

DESCRIPTION OF EMBODIMENTS

Hereinafter, an embodiment of the present invention will be described in detail. As an embodiment of the curing material according to the present invention, a photo-curing material that is curable with light such as ultraviolet radiation will be described as an example. For example, the photo-curing material can be composed of a composition of a photo-curing component (A), a chain transfer agent (B), a photo-polymerization initiator (C), and the like. The solubility parameter (SP value) of the photo-curing material is 9.4 or more. The solubility parameter according to the present invention is obtained by using Small's method. That is, it is a numerical value obtained by estimating the solubility parameter from the molecular structure by using the Small's calculation method.

Specifically, the solubility parameter was estimated by the Small's calculation method shown below.

$$\delta = \Sigma Fi/V = \rho \Sigma Fi/M$$

($\delta$ is the solubility parameter, Fi is the molar attraction force, V is the molar volume, $\rho$ is the density, and M is the molecular weight)

See, "Polymer blend" by Saburo Akiyama et al., (1981, CMC) P. 125 to P. 144.

When the solubility parameter of the curing material is less than 9.4, the curing material becomes compatible with the plasticizer, and the plasticizer in the resin in contact with the curing material tends to migrate into the curing material. In order to further favorably prevent the migration of the plasticizer, a preferable solubility parameter of the curing material is 10 or more. The solubility parameter of the curing material can be adjusted to fall within the above-described range by appropriately selecting the molecular structures of components such as the curing component and the chain transfer agent, and the like that are formulated in the curing material.

As the photo-curing component (A), it is possible to use a photo-curing material capable of providing a cured product by being irradiated with light such as ultraviolet radiation. Note that the photo-curing materials include those capable of providing a cured product by irradiation of visible light, infrared radiation, and the like, apart from ultraviolet radiation.

As the photo-curing material, it is possible to use an ultraviolet curing material, for example. As the ultraviolet curing material, it is possible to use an existing ultraviolet curing material. Specifically, it is possible to use any ultraviolet curing material capable of providing a cured product by being mixed with a curing monomer or oligomer such as (meth)acrylate and the photo-polymerization initiator (C), and being irradiated with ultraviolet radiation. Note that in the present invention, the word "(meth)acrylate" means acrylate and/or methacrylate.

According to the curing principle of the ultraviolet curing material, a photo-polymerization initiator absorbs ultraviolet radiation (ultraviolet light) to generate active species such as radical species, and the active species cure a carbon-carbon double bond such as (meth)acrylate by radical polymerization. However, in an ordinary ultraviolet curing, the ultraviolet curing material remains uncured in a portion where ultraviolet radiation is shielded (blocked). In this respect, the addition of the above-described chain transfer agent (B) makes it possible to initiate and promote polymerization reaction by transmitting the radicals generated by irradiation with ultraviolet radiation to a location where ultraviolet radiation is shielded and no radical is generated, thus curing a dark area where ultraviolet radiation is shielded. That is, the addition of the chain transfer agent (B) makes it possible to impart a dark-area curability of being able to cure portions that the irradiation light does not reach.

Preferably, the photo-curing material has fluidity at room temperature, can be applied to a plasticizer, and can be cured at room temperature. When the photo-curing material has fluidity and is curable at room temperature, it does not need to be heated to high temperature unlike the hot-melt adhesive, and can be readily applied and cured.

As the above-described (meth)acrylate compound, any conventionally known compound having one or more (meth)acrylate groups in the molecule may be used without any particular limitations. Specific examples of the (meth)acrylate compound include mono(meth)acrylates such as isobornyl(meth)acrylate, bornyl(meth)acrylate, tricyclodecanyl(meth)acrylate, dicyclopentanyl(meth)acrylate, dicyclopentenyl(meth)acrylate, cyclohexyl(meth)acrylate, (meth)acrylic acid, benzyl(meth)acrylate, 4-butylcyclohexyl (meth)acrylate, (meth)acryloyl morpholine, 2-hydroxyethyl (meth)acrylate, 2-hydroxypropyl(meth)acrylate, 4-hydroxybutyl(meth)acrylate, methyl(meth)acrylate, ethyl(meth)acrylate, propyl(meth)acrylate, isopropyl(meth)acrylate, octyl(meth)acrylate, isooctyl(meth)acrylate, nonyl(meth)acrylate, decyl(meth)acrylate, isodecyl(meth)acrylate, undecyl(meth)acrylate, dodecyl(meth)acrylate, lauryl(meth)acrylate, stearyl(meth)acrylate, isostearyl(meth)acrylate, tetrahydrofurfuryl(meth)acrylate, polyethylene glycol mono(meth)acrylate, polypropylene glycol mono(meth)acrylate, methoxy ethylene glycol(meth)acrylate, ethoxyethyl(meth)acrylate, methoxy polyethylene glycol(meth)acrylate, methoxy polypropylene glycol(meth)acrylate, polyoxyethylene nonylphenyl ether acrylate, diacetone(meth)acrylamide, isobutoxymethyl(meth)acrylamide, N,N-dimethyl(meth)acrylamide, t-octyl(meth)acrylamide, dimethylaminoethyl(meth)acrylate, diethylaminoethyl(meth)acrylate, 7-amino-3,7-dimethyloctyl(meth)acrylate, N,N-diethyl(meth)acrylamide and N,N-dimethylaminopropyl(meth)acrylamide; and poly(meth)acrylates such as butanediol di(meth)acrylate, hexanediol di(meth)acrylate, nonanediol di(meth)acrylate, decanediol di(meth)acrylate, 2-butyl-2-ethyl-1,3-propanediol di(meth)acrylate, 2-hydroxy-3-acryloyloxypropyl methacrylate, dipropylene glycol di(meth)acrylate, tripropylene glycol di(meth)acrylate, triethylene glycol di(meth)acrylate, tetraethylene glycol di(meth)acrylate, tricyclodecane dimethylol di(meth)acrylate, 1,4-butanepolyol di(meth)acrylate, 1,6-hexane polyol di(meth)acrylate, neopentyl glycol di(meth)acrylate, polyethylene glycol di(meth)acrylate, polypropylene glycol di(meth)acrylate, 9,9-bis[4-(2-acryloyloxy ethoxy)phenyl]fluorene, polyester di(meth)acrylate, tris(2-hydroxyethyl) isocyanurate tri(meth)acrylate, tris(2-hydroxyethyl)isocyanurate di(meth)acrylate, tricyclodecane dimethylol di(meth)acrylate, EO adduct di(meth)acrylate of bisphenol A, EO adduct or PO adduct polyol di(meth)acrylate of hydrogenated bisphenol A, epoxy(meth)acrylate obtained by adding (meth)acrylate to diglycidyl ether of bisphenol A, triethylene glycol divinyl ether, trimethylolpropane tri(meth)acrylate, pentaerythritol tri(meth)acrylate, trimethylol propane EO adduct tri(meth)acrylate, trisacryloyloxy ethyl phosphate, pentaerythritol tetra(meth)acrylate, tetrafurfuryl alcohol oligo(meth)acrylate, ethyl carbitol oligo(meth)acrylate, 1,4-butanediol oligo(meth)acrylate, 1,6-hexanediol oligo(meth)acrylate, trimethylolpropane oligo(meth)acrylate, pentaerythritol oligo(meth)acrylate, (poly)urethane (meth)acrylate and (poly)butadiene (meth)acrylate. These may be used alone or in combination of two or more.

The chain transfer agent is composed of a nitrogen-containing compound (a) containing a polyether structure and two or more urethane bonds or two or more urea bonds in the molecule, and a metal-containing compound (b). Preferably, the polyether structure of the above-described nitrogen-containing compound (a) includes three or more oxygen atoms.

There is no particular limitation to the above-described nitrogen-containing compound (a), and any known nitrogen-containing compound can be used as long as it contains two or more of at least one of a urethane bond moiety represented by Formula 1 below and a urea bond moiety represented by (Formula 2) below in the molecule, and has a polyether structure.

—NH—COO—  Formula 1:

—NH—CO—NH—  Formula 2:

Specific examples of the nitrogen-containing compound serving as the component (a) include polyurethane and polyurea compounds that use polyether polyol. The aforementioned polyurethane and polyurea are obtained by reacting an isocyanate-containing compound with a compound containing a hydroxyl group (—OH) of polyether polyol, a compound containing amine (—NH$_2$), or the like.

Examples of the isocyanate-containing compound include the following compounds. Polyisocyanates including: aliphatic isocyanates such as methylene diisocyanate, ethylene diisocyanate, tetramethylene diisocyanate, hexamethylene diisocyanate (HDI), dodecamethylene diisocyanate, 2,2,4-trimethyl hexamethylene diisocyanate, lysine diisocyanate (LDI) and 1,3,6-hexamethylene triisocyanate; alicyclic isocyanates such as hydrogenated-4,4'-diphenylmethane diisocyanate (hydroganated MDI), hydrogenated-xylylene diisocyanate (hydroganated XDI), 1,4-cyclohexane diisocyanate, hydrogenated-2,4-tolylene diisocyanate (hydroganated TDI), isophorone diisocyanate (IPDI) and norbornene diisocyanate (NBDI); araliphatic isocyanates such as xylylene diisocyanate (XDI) and tetramethyl xylylene diisocyanate (TMXDI); and aromatic isocyanates such as 1,4-diphenyl diisocyanate, 2,4 or 2,6-tolylene diisocyanate (TDI), 2,4 or 4,4-diphenyl methane diisocyanate (MDI), 1,5-naphthalene diisocyanate (NDI), 3,3'-dimethyl-4,4'-diphenyl methane diisocyanate, O-tolidine diisocyanate, polyphenyl methane polyisocyanate (crude MDI), triphenyl methane triisocyanate and tris(isocyanate phenyl)thiophosphate. Examples of the isocyanate-containing compound include biuret-type polyisocyanates obtained by further reacting the aforementioned polyisocyanates with water, adduct-type polyisocyanates obtained by reacting the polyisocyanates with polyhydric alcohol such as trimethylol propane, a liquid prepolymer obtained by polymerizing a part of polyhydric isocyanate with a polyester or a polyether derivative, a polymer obtained by isocyanuratization. These may be used alone or in combination of two or more.

Examples of the polyether polyol that is reacted with the isocyanate-containing compounds to obtain various polyurethanes include diols such as polyethylene oxide and polypropylene oxide having hydroxyl groups at both ends, random and block copolymers of polyethylene oxide and polypropylene oxide, polyoxyethylene glycol, polyoxypropylene glycol and polyoxytetramethylene glycol; and triols such as polyoxyalkylene polyol having three hydroxyl groups.

Polyether polyol preferably has three or more oxygen atoms in one molecule.

Since it is only required that polyether polyurethane is eventually in a melted or suspended state when being mixed in the curing material, it does not necessarily have to be liquid. However, in terms of ease of mixing, it is preferably liquid, and a hydroxyl group-containing compound used at this time is preferably a liquid compound having a molecular weight of 100000 or less.

Examples of amine-containing compounds include amines containing 1 to 30 carbon chains and having a primary or secondary amino group at an end, diamine-terminated (poly)ethylene glycol, diamine-terminated (poly)propylene glycol, diamine-terminated (poly)hexamethylene glycol, diamine-terminated (poly)caprolactone, diamine-terminated (poly)ester (poly)ol, diamine-terminated (poly)amide, and diamine-terminated (poly)ester.

As for the polyurethane and polyurea compounds, the terminal group may be blocked with an alkyl group or a (meth)acryl group, an epoxy group, an oxazolyl group, a carbonyl group, a thiol group, thioether group, a thioester group, a phosphoric acid (ester) group, a phosphonic acid (ester) group, a carboxylic acid (ester) group or the like, for example, via a (thio)ether, (thio)ester, amide, (thio)urethane, (thio)urea, or N-alkyl bond after polymerization as needed.

A plurality of types of the above-described urethane bond or urea bond may be bonded, or the urethane bond or urea bond may be contained in the molecule by combining the end groups.

As the metal of the metal-containing compound serving as the component (b) that constitutes the chain transfer agent (B), it is preferable to use one or more metals selected from tin, copper, zinc, cobalt, and nickel. As the metal-containing compound serving as the component (b), it is possible to use any known compound containing one or more of the above-described metals in the form of a metal salt or complex in the constituent molecule, without any particular limitations.

Examples of the metal salt include metal salts of the metal species, such as carboxylates, phosphates, sulfonates, hydrochlorides, bromates, and perchlorites.

As the metal complex, it is possible to use any known metal complex that is stabilized by being ligated with an organic ligand capable of forming a coordinate bond with the metal species at 1:1 to 1:4 (metal:ligand), without any particular limitations.

Specific examples of the metal-containing compound serving as the component (b) include bis(2,4-pentanedionato)tin, dibutyltin bis(trifluoromethanesulfonate), dibutyltin diacetate, dibutyltin dilaurate, dibutyltin maleate, phthalocyanine tin(IV) dichloride, tetrabutylammonium difluoro triphenyltin, phthalocyanine tin(IV), tributyl(2-pyridyl)tin, tributyl(2-thienyl)tin, tributyltin acetate, tributyl(trimethylsilylethynyl)tin, trimethyl(2-pyridyl)tin, bis(hexafluoroacetylacetonato)copper(II), bis(2,4-pentanedionato)copper(II), bis(1,3-propanediamine)copper(II)dichloride, bis(8-quinolinolato)copper(II), bis(trifluoro-2,4-pentanedionato)copper(II), copper(II) bis(2-hydroxyethyl) dithiocarbamate, copper diethyldithiocarbamate, copper (II) dimethyldithiocarbamate, copper(II) disodium ethylene diaminetetraacetate, phthalocyanine copper(II), dichloro(1,10-phenanthroline) copper(II), phthalocyanine copper, tetra-4-tert-butylphthalocyanine copper, tetrakis(acetonitrile)copper(I) hexafluorophosphate, copper naphthenate, bis[2-(2-benzothiazolyl)phenolate zinc(II), bis[2-(2-benzoxazoly)phenolate]zinc(II), bis(2-hydroxyethyl)zinc(II) dithiocarbamate, bis(2,4-pentanedionato)zinc(II), bis(8-quinolinolato)zinc(II), bis(tetrabutylammonium)bis(1,3-dithiol-2-thione-4,5-dithiolato)zinc complex, zinc disodium ethylenediaminetetraacetate, zinc(II) dibenzyl dithiocarbamate, zinc (II) dibutyl dithiocarbamate, zinc diethyldithiocarbamate, zinc dimethyldithiocarbamate, zinc phthalocyanine, zinc naphthenate, bis(cyclopentadienyl)cobalt(III)hexafluorophosphate, [1,1'-bis(diphenylphosphino)ferrocene]cobalt(II)dichloride, bis(hexafluoroacetylacetonato)cobalt(II), (1R,2R)—N,N'-bis[3-oxo-2-(2,4,6-trimethylbenzoyl)butylidene]-1,2-diphenylethylenediaminato cobalt(II), (1S,2S)—N,N-bis[3-oxo-2-(2,4,6-trimethylbenzoyl)butylidene]-1,2-diphenylethylenediaminato)cobalt(II), bis(2,4-pentanedionato)cobalt(II), bis(trifluoro-2,4-pentanedionato)cobalt(II), phthalocyanine cobalt(II), cobalt disodium ethylenediaminetetraacetate, hexamminecobalt(III) chloride, N,N'-disalicylalethylenediamine cobalt(II), [5,10,15,20-tetrakis(4-methoxyphenyl)porphyrinato]cobalt(II), tris(2,4-pentanedionato)cobalt(III), cobalt naphthenate, [1,2-bis(diphenylphosphino)ethane]nickel(II)dichloride, bis(dithiobenzyl)nickel(II), bis(hexafluoroacetylacetonato) nickel(II), bis(2,4-pentanedionato)nickel(II), bis(tetrabutylammonium)bis(maleonitriledithiolato)nickel(II) complex, bis(tricyclohexylphosphine)nickel(II) dichloride, bis(triphenylphosphine)nickel(II) dichloride, bromo[(2,6-pyridinediyl)bis(3-methyl-1-imidazolyl-2-ylidene)]nickel bromide, nickel(II) disodium ethylenediaminetetraacetate, nickel(II) dibutyldithiocarbamate, and nickel diethyldithiocarbamate. These may be used alone or in a combination of two or more.

The metal-containing compound serving as the component (b) does not necessarily have to have high solubility in an organic substance because it is only required to be eventually homogeneous with the photo-curing material. However, the compound is preferably in the form of an organic acid salt or metal complex from the viewpoint of ease of mixing and the prevention of precipitation during storage.

The metal-containing compound serving as the component (b) can constitute a chain transfer agent by being complexed with a compound containing the polyether structure and the urethane bonds or the urea bonds of the component (a).

Although there is no particular limitation to the method of complexing the component (a) and the component (b) as long as the two components are mixed at room temperature or under a heating condition, it is preferable to use a method in which the components are dissolved or uniformly dispersed by being sufficiently stirred or kneaded at an appropriate temperature under reduced pressure or inert gas atmosphere of nitrogen or the like by using a stirring device such as a mixer.

As the photo-polymerization initiator (C), any known compound that absorbs ultraviolet radiation to initiate radical polymerization can be used without any particular limitations.

Specific examples of the above-described photo-polymerization initiator include 1-hydroxycyclohexyl phenyl ketone, 2,2-dimethoxy-2-phenylacetophenone, xanthone, fluorenone, benzaldehyde, fluorene, anthraquinone, ethylanthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethylketal, 1-(4-isopropylphenyl)-2-hydroxy-2-methylpropane -1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino -propane-1-one, 2,4,6-trimethylbenzyoyl diphenylphosphine oxide, and bis-(2,6-dimethoxybenzoyl)-2,4,4-trimethylpentyl phosphine oxide. These may be used alone or in a combination of two or more.

As the photo-polymerization initiator, it is also possible to use commercially available products, including, for example, IRGACURE 184, 369, 651, 500, 907, CGI 1700, CGI 1750, CGI 1850, CG 24-61; Darocure 1116, 1173, Lucirin TPO (all manufactured by BASF), and Ubecryl P36 (manufactured by UCB).

There is no particular limitation to the mixing method used for adding the chain transfer agent to the photo-curing material, but it is preferable to use a method in which the chain transfer agent is dissolved or uniformly dispersed by being sufficiently stirred or kneaded at an appropriate temperature under reduced pressure or an inert gas atmosphere of nitrogen or the like by using a stirring device such as a mixer.

There is no particular limitation to the amount of formulation of the chain transfer agent with respect to the photo-curing material, and the chain transfer agent may be added as appropriate according to the type of the photo-curing material, the required dark-area curability, and the like.

The photo-curing material may contain various additives as needed. Examples of the additives include a stabilizing agent, a softening agent, a pigment, a dye, an antistatic agent, a flame retardant, a sensitizer, a dispersing agent, a solvent, and an antibacterial/antifungal agent. These various additives may be used in combination as appropriate.

The composition can be obtained by mixing the above-described components. There is no particular limitation to the mixing method, and it is preferable to use a method in which the components are dissolved or uniformly dispersed by being sufficiently stirred or kneaded at an appropriate temperature under reduced pressure or an inert gas atmosphere of nitrogen or the like by using a stirring device such as a mixer.

Examples of the resin containing the plasticizer that is used in contact with the curing material of the present invention include, but are not particularly limited to, a polyvinyl chloride resin (may be also referred to as a PVC resin), an acrylic resin, a polyurethane resin, a polyolefin resin, a phenol resin, and a polyamide resin.

There is no particular limitation to the above-described plasticizer, and any known plasticizer may be used. Examples of the plasticizer include phthalic acid derivatives such as dimethyl phthalate, diethyl phthalate, dibutyl phthalate, dihexyl phthalate, diethylhexyl phthalate, diisononyl phthalate, diisodecyl phthalate, ditridecyl phthalate and butylbenzyl phthalate; adipic acid derivatives such as dioctyl adipate, diisononyl adipate, diisodecyl adipate and butyl diglycol adipate; sebacic acid derivatives such as dibutyl sebacate and dioctyl sebacate; azelaic acid derivatives such as dioctyl azelate; phosphoric acid derivatives such as tricresyl phosphate, tributyl phosphate, trioctyl phosphate and tributoxyethyl phosphate; epoxy derivatives such as epoxy fatty acid esters, epoxy fats and oils, epoxidized soybean oil and epoxidized linseed oil; polyester derivatives such as sebacic acid polyesters, adipic acid polyesters and phthalic polyester; chlorinated paraffin; and trimellitic acid derivatives such as trioctyl trimellitate, tributyl trimellitate and toriisodecyl trimellitate.

As the plasticizer in the resin with which the curing material of the present invention comes into contact, tributoxyethyl phosphate (SP value: 8.6), dioctyl sebacate (SP value: 8.7), trioctyl trimellitate (SP value: 8.7), phthalic polyester (SP value: 9.0) and the like are preferable because their solubility parameters are higher than 9.4 and far from that of the curing material.

The curing material of the present invention can achieve the effect of being able to prevent the migration of the plasticizer from the resin to the cured product of the curing material and the like when the curing material is used in an application in which it is in contact with a resin containing a plasticizer in an adhesive material, a coating material, a sealing material, a molding material and the like of an automobile component, an electrical/electronic device, an aircraft component and the like. In particular, the curing material can be suitably used for a wire harness.

A wire harness is composed of one terminal-equipped wire obtained by connecting a terminal to an end of a covered wire, or composed of a combination of a plurality of such wires. The circumference of the conductor of the covered wire of the wire harness is covered with a covering material. As the covering material of the covered wire, a plasticizer-containing resin such as a soft polyvinyl chloride resin is used. Additionally, a component made of a cured product cured by using the above-described photo-curing material is disposed at a portion of the wire harness that comes into contact with the covered wire.

Examples of the component that uses a photo-curing material for use in the wire harness include a waterproofing agent, an anticorrosive, an exterior equipment fixing component, a path regulating component, and an adhesive.

The wire harness may be formed by binding a plurality of covered wires by using tape, or may be sheathed with a sheath component such as a round tube, a corrugated tube, or a protector.

A stranded wire obtained by twisting a plurality of strands together or a single wire is used as the wire conductor of the above-described covered wire. In this case, the stranded wire may be composed of a single metal strand, or may be composed of two or more metal strands. Apart from the metal strand, the stranded wire may include a strand made of organic fiber, for example. Note that "composed of a single metal strand" means that all of the metal strands constituting the stranded wire are made of the same metal material, and "composed of two or more metal strands"

means that metal strands made of metal materials different from one another are included in the stranded wire. In addition, a reinforcement wire (tension member) or the like for reinforcing the covered wire may be included in the stranded wire.

The material of the metal strand constituting the above-described conductor can be exemplified, for example, by copper, a copper alloy, aluminum, an aluminum alloy, or materials obtained by forming various types of plating on these materials. The material of the metal strand serving as the reinforcement wire can be exemplified, for example, by a copper alloy, titanium, tungsten, and stainless steel. Examples of the organic fiber serving as the reinforcement wire include aromatic polyamide fibers such as poly-(p-phenyleneterephthalamide).

As the material of the covering material of the above-described covered wire, it is possible to use, apart from a soft polyvinyl chloride resin, any resin that can be used as the covering material of an insulated wire, including, for example, rubber, polyolefins such as polyethylene and polypropylene, a thermoplastic elastomer, other thermoplastic resins, a curing resin, without any particular limitations. These may be used alone or as a mixture of two or more. The covering material may be either a resin containing a plasticizer or a resin free of a plasticizer. Various additives may be included as appropriate in the material of the covering material. Examples of the additives include a flame retardant, a filler, and a colorant. Even when the covering material is a resin containing a plasticizer, such as a soft polyvinyl chloride resin, the waterproofing agent has the effect of preventing the migration of the plasticizer. Accordingly, a reduction in adhesion or the like caused by the migration of the plasticizer can be prevented even in the case where the waterproofing agent comes into contact with the covering material, and it is thus possible to achieve a good waterproofness.

The ultraviolet irradiation condition for curing the photo-curing material can be selected as appropriate according to the composition and the like of the photo-curing material. A known apparatus can be used as the irradiation apparatus used for ultraviolet irradiation. As the irradiation apparatus, it is possible to use, for example, a light source such as a valve-type UV lamp in which Hg, Hg/Xe, or a metal halide compound or the like is encapsulated, and an LED-UV lamp. Also, a light collection-type UV irradiation apparatus that collects light from the above-described light source by a reflection mirror and radiates the light may be used as the ultraviolet irradiation apparatus.

The wire harness according to the present invention is suitable for being routed in a vehicle such as an automobile.

Figure 1:
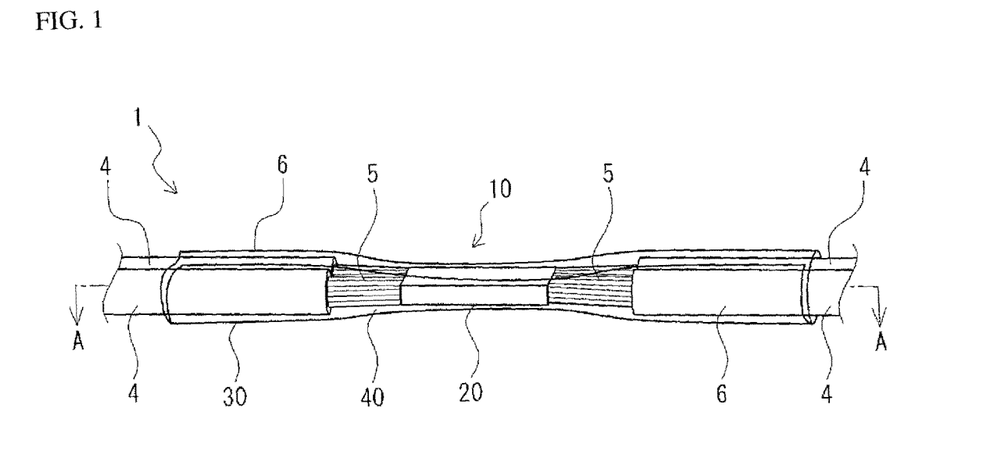
FIG. 1 is an external perspective view showing an example of a wire harness according to the present invention.
Figure 2:
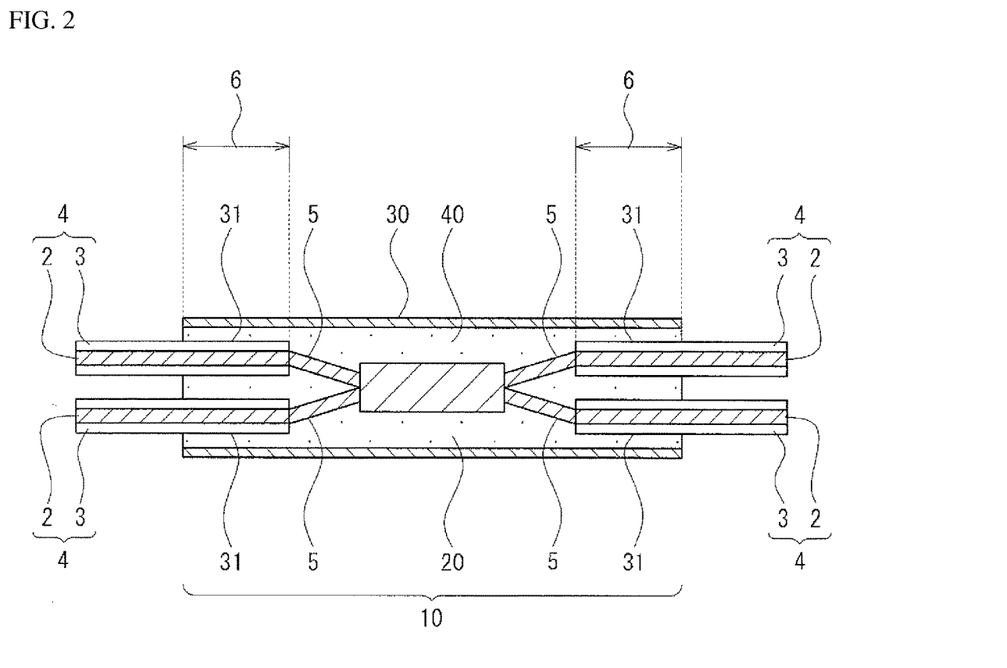
FIG. 2 is a horizontal cross-sectional view taken along the lines A-A in FIG. 1.

FIG. 1 is an external perspective view showing an example of the wire harness according to the present invention, and FIG. 2 is a horizontal cross-sectional view taken along the lines A-A in FIG. 1. The curing material can be used as a waterproofing agent of an intermediate spliced portion of the wire harness. As shown in FIGS. 1 and 2, the wire harness 1 is constituted by a wire bundle of four bundled insulated wires 4 each obtained by covering the circumference of a conductor 2 made of a core wire with a covering material 3 made of an insulating body.

An intermediate spliced portion 20 of the wire harness 1 includes conductor exposed portions 5 in which the insulated wires 3 of the wire bundle have been peeled away so as to expose the conductors 2 inside. At the conductor exposed portions 5, the conductors 2 of the plurality of (four) insulated wires 4 are bonded to each other, thus electrically connecting the insulated wires to each other.

The conductor exposed portions 5 of the intermediate spliced portion 20 are covered with a waterproofing agent 40. Further, a waterproof portion 10 is constituted by covering the surface of the waterproofing agent 40 with a protective sheet 30 having light transmissivity for irradiation light used for curing the photo-curing material. The waterproofing agent 40 is obtained by curing the above-described photo-curing material in the composition of the waterproofing agent. Until the waterproofing agent 40 of the waterproof portion 10 is cured, the protective sheet 30 is used as a protective member for retaining the waterproofing agent 40 at a predetermined location. The protective member is not limited to a sheet material such as the protective sheet 30, and may be formed, for example, in the shape of a tube as a protective tube described below.

The above-described protective sheet 30 has the flexibility of being able to be deformed so as to follow the deformation of the surface of the waterproofing agent 40 of the waterproof portion 10. The protective sheet 30 covers the circumference of the waterproofing agent 40 while being in close contact (areal contact) with the surface of the waterproofing agent 40. The waterproofing agent 40 of the waterproof portion 10 permeates the interior of the conductor exposed portions 5 of the insulated wires 4, and is cured up to the portion of the permeated interior that irradiation light does not reach.

Additionally, the waterproofing agent 40 of the waterproof portion 10 is cured in close contact with the surface of the covering materials 3 of the insulated wires 4 that are adjacent to the conductor exposed portions 5, as shown in FIG. 2. Furthermore, in the waterproof portion 10, the waterproofing agent 40 covers front and back covered portions 6 of the conductors 2 adjacent to the conductor exposed portions 5 of the insulated wires 4. By the waterproofing agent 40 covering the covered portions 6 in this way, it is possible to prevent the entry of moisture from the gaps between the end portions of the covering materials 3 on the intermediate spliced portion 20 side and the conductors 2, thus providing a waterproofing effect.

Figure 3:
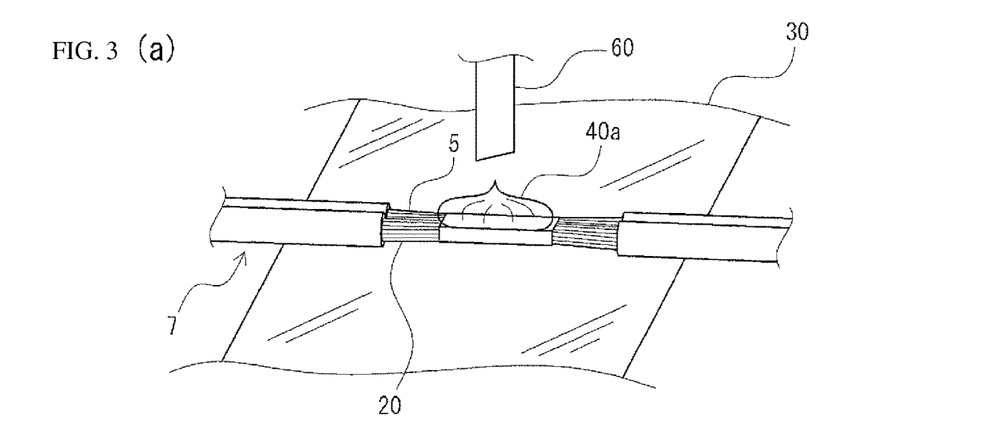
FIGS. 3(a) to 3(c) are process step diagrams for illustrating a manufacturing method of a wire harness according to the present invention, showing an area in the vicinity of a spliced portion.

FIGS. 3(a) to 3(c) are process step diagrams showing an area in the vicinity of a spliced portion for illustrating a manufacturing method of a wire harness according to the present invention. As shown in FIGS. 3(a) to 3(c), a composition 40a of the waterproofing agent formed from a photo-curing material preferably has enough fluidity to be able to permeate the spliced portion 20 when being heated, and to spread into the gaps between the insulating bodies 3 of the insulated wires 4, between the strands constituting each conductor 2, and between the conductors 2 so as to fill the gaps.

The protective sheet 30 covers the surface of the waterproofing agent 40 while being in close contact with the surface of the waterproofing agent 40. The protective sheet 30 is transmissive (optically transmissive) for the irradiation light such as ultraviolet radiation used for curing the photo-curing material of the waterproofing agent 40. For example, as the light transmissivity of the protective sheet 30, the ultraviolet transmittance is preferably 50% or more, and more preferably 90% or more. The thickness of the protective sheet 30 is preferably 100 μm or less, more preferably 5 to 50 μm.

As the protective sheet 30, it is possible to use a wrap sheet of an olefin-based resin such as polyethylene, polypropylene, polyvinyl chloride, polyvinylidene chloride and polyvinylidene fluoride, or a wrap sheet of commodity plastics such as polyester, polyethylene terephthalate and nylon. A resin containing a plasticizer can be used as the protective sheet 30. In particular, a sheet of a polyvinyl chloride resin, a polyvinylidene chloride resin, or a poly (vinylidene fluoride) resin that have good self-adhesion (cohesion) are suitable as the protective sheet 30.

The protective sheet 30 has a Young's modulus (value at room temperature in the measuring direction in accordance with JIS-K7113) in the range from 50 to 500 MPa for a thickness of less than 50 μm, in the range from 10 to 100 MPa for a thickness of 50 μm to 100 μm, and less than 10 MPa for a thickness exceeding 100 μm. The protective sheet 30 has an elongation at rupture of preferably 20% or more, more preferably 50% or more.

The self-adhesive power of the protective sheet 30 that is represented by a peel adhesion power (value at room temperature in the measurement method in accordance with JIS-Z0237 or JIS-K6854) is preferably in the range from 0.5 to 10 N/m. In the waterproof portion 10, the waterproofing agent 40 is cured in a state in which the protective sheet 30 has been deformed so as to follow the deformation of the surface of the waterproofing agent 40 and the surface of the waterproofing agent 40 and the protective sheet 30 are in close contact with each other. A protective sheet 30 having a high self-adhesive power facilitates covering when the protective sheet 30 is wrapped around the circumference of the intermediate spliced portion 20 and the waterproofing agent 40, and has excellent workability.

In addition, a cohesive layer made of a weak cohesive having a thickness of 10 μm or less may be formed on the surface of the protective sheet 30. The thickness of the cohesive layer is preferably 5 μm or less.

In the following, a description will be given of a manufacturing method of the wire harness shown in FIG. 1. As shown in FIG. 3(a), first, a wire bundle 7 is provided in which an intermediate spliced portion 20 has been formed in advance by using a plurality of insulated wires. The wire bundle 7 includes conductor exposed portions 5 formed by removing the covering materials 3 of the insulated wires 4 so as to expose the conductors 2 inside.

Then, as shown in FIG. 3(a), a protective sheet 30 having a size sufficient to cover the intermediate spliced portion 20 is provided, and the intermediate spliced portion 20 of the wire bundle 7 is placed on the protective sheet. Next, a composition 40a of the above-described waterproofing agent is supplied onto the intermediate spliced portion 20. The composition 40a of the waterproofing agent can be cured at a location that light does not reach, and contains a photo-curing resin and a chain transfer agent. The composition 40a of the waterproofing agent is supplied by being discharged in a predetermined amount from a nozzle 60 of a discharging apparatus. The composition 40a of the waterproofing agent may be supplied either at room temperature or in a heated state.

The composition 40a of the waterproofing agent may be supplied to the surface of the protective sheet 30, not to the intermediate spliced portion 20, and thereafter, the intermediate spliced portion 20 of the wire bundle may be placed on the composition 40a of the waterproofing agent.

Next, as shown in FIG. 3(b), the protective sheet 30 is folded such that the folded-back portion side of the protective sheet 30 is wrapped onto the intermediate spliced portion 20 and the composition 40a of the waterproofing agent, and that an overlapping portion 32 where opposite ends of the protective sheet 30 overlap each other is formed at a portion where the intermediate spliced portion 20 is not located. The overlapping state of the overlapping portion 32 of the protective sheet 30 is maintained by the self adhesion of the protective sheet 30.

Next, the protective sheet 30 is wrapped onto the surface of the composition 40a in the waterproofing agent of the intermediate spliced portion 20 such that the composition 40a of the waterproofing agent is filled into the interior of the protective sheet 30. After the protective sheet 30 is folded into two, the composition 40a of the waterproofing agent in the overlapping portion 32 is pushed toward the intermediate spliced portion 20 by squeezing the overlapping portion of the protective sheet 30 with a roll 51. Then, the overlapping portion 32 of the protective sheet 30 is wrapped around the waterproof portion 10 so as to be brought into close contact therewith.

Next, as shown in FIG. 3(c), the overlapping portion of the protective sheet 30 is wound around the intermediate spliced portion 20 and the waterproofing agent 40. By pulling the protective sheet 30 and wrapping it with a tension applied thereto, the protective sheet 30 is wrapped around the circumference of the intermediate spliced portion 20 and the composition 40a of the waterproofing agent in a state in which the waterproof portion 10 is pressed from the outside of the protective sheet 30.

As a result, the composition 40a of the waterproofing agent that is locally present around the intermediate spliced portion 20 is pushed out and spreads between the outer circumferential portion of the intermediate spliced portion 20 and the protective sheet 30 so as to cover the entire outer circumference of the intermediate spliced portion 20. The protective sheet 30 is maintained in the state of being wrapped around the circumference of the waterproof portion 10 by the self adhesion. Also, the waterproof portion 10 is maintained in the state of being pressed from the outside of the protective sheet 30.

Next, as shown in FIG. 3(c), in a state in which the protective sheet 30 is wrapped around the outer circumference of the intermediate spliced portion 20 and the composition 40a of the waterproofing agent, ultraviolet radiation 53 is radiated to the intermediate spliced portion 20 by using an ultraviolet irradiation apparatus 52, thus curing the composition 40a of the waterproofing agent into a waterproofing agent 40.

The ultraviolet radiation 53 radiated to the intermediate spliced portion 20 passes through the protective sheet 30 and is radiated to the composition 40a of the waterproofing agent. At this time, the irradiation of ultraviolet radiation is performed under an irradiation condition under which the composition 40a of the waterproofing agent can be cured. Since the composition 40a of the waterproofing agent contains a chain transfer agent, it can be cured in a portion that the irradiation light reaches, and also can be cured in a location where irradiation light does not reach, making it possible to obtain a waterproof portion 10 in which the waterproofing agent 40 has been cured all the way to the interior thereof. Since the entire waterproof portion 10 can be cured merely by irradiation of light such as ultraviolet radiation, it is not necessary to perform, for example, a post curing step of heating after light irradiation.

Note that to apply the composition 40a of the waterproofing agent, the intermediate spliced portion 20 may be heated by using a heating apparatus or the like so as to reduce the viscosity of the composition 40a of the waterproofing agent, thus facilitating the permeation of the composition 40a into the gaps between the strands of the conductors 2 or the gaps between the insulated wires 4. As such a heating apparatus, it is possible to use, for example, a ceramic heater, a hot-air jet heater, a pipe electromagnetic heater, a halogen lamp heater, a contact rubber heater, or the like.

Figure 4:
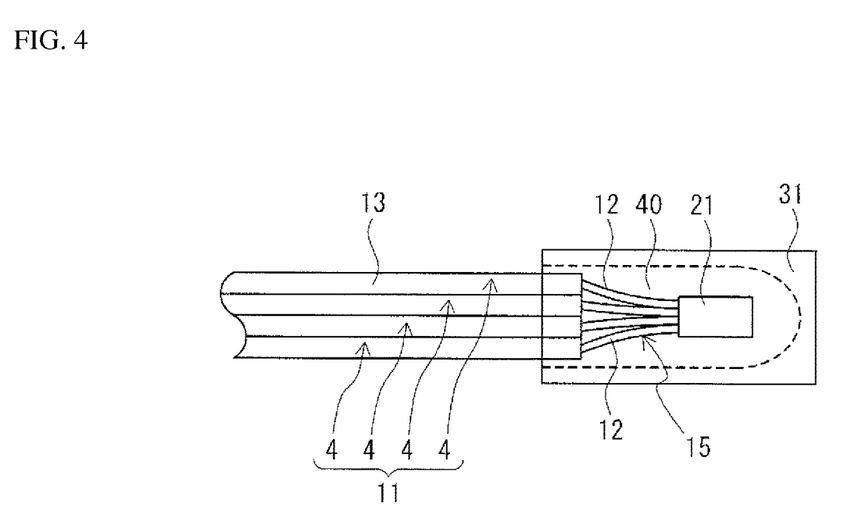
FIG. 4 is an explanatory drawing showing an example of a wire harness including an end spliced portion.

Although the above-described embodiment is an example in which the curing material is applied to the waterproofing agent of the intermediate spliced portion, the curing material may be applied as the waterproofing agent of an end splice. In the following, waterproofing of an end spliced portion will be described. FIG. 4 is an explanatory drawing showing an example of a wire harness including an end spliced portion.

As shown in FIG. 4, a wire harness 1 before the formation of a waterproof portion includes a wire bundle 11 of four insulated wires 4, and has a conductor exposed portion 15 formed by removing a covering material 13 at an end portion of the insulated wires 4 so as to expose conductors 12. Further, the conductor exposed portion 15 includes an end spliced portion 21 in which ends of the conductors 12 are bonded to each other. The insulated wires of the wire bundle 11 are electrically connected to each other by the end spliced portion 21. The end spliced portion 21 is bonded by a known bonding method such as crimping and welding The conductor exposed portion 15 is covered with a waterproofing agent formed from the above-described curing material. Further, the surface of the waterproofing agent is covered with a protective tube 31 serving as a light-transmissive protective material, thus constituting a waterproof portion 10. The protective tube 31 is formed from a resin containing a plasticizer. The same resin as that used for the above-described protective sheet may be used for the protective tube 31. The protective tube 31 is formed in a cap-like shape that is closed at one end and open at the other end.

In the area of the conductor exposed portion 15 other than the end spliced portion 21, there are gaps between the conductors 12. The waterproofing agent 40 is also filled into these gaps. In addition, the waterproofing agent 40 and the protective tube 31 cover from the conductor exposed portion 15 up to the surface of the covering material 13 at an end portion of the wire bundle 11.

FIG. 5 are diagrams illustrating a manufacturing method of a wire harness including the end spliced portion. To form a waterproof portion 10 in the wire harness 1, first, the covering material is stripped off at the end portion of the wire bundle 11 of the plurality of bundled insulated wires to form a conductor exposed portion 15 in which the conductors inside the insulated wires are exposed, and the ends of the conductors are bonded to form an end spliced portion 21, as shown in FIG. 5(a). Then, as shown in FIG. 5(b), a protective tube 31 in which the above-described photo-curing material 40a is placed inside is provided. Then, as shown in FIG. 5(c), the wire bundle 11 is immersed in the curing material 40a inside the protective tube 31 to supply the composition 40a of the waterproofing agent to the wire bundle. The whole of the end spliced portion 21 and the conductor exposed portion 15 and a part of the covering material 13 of the wire bundle 11 are covered. In a state in which the surface of the photo-curing material is covered with the protective member (protective tube 31) formed form a resin containing a plasticizer and having light transmissivity, light irradiation is performed to cure the curing material, thus forming a waterproof portion. As shown in FIG. 5(d), a wire harness having a waterproof portion in which the end spliced portion 21 is covered with the waterproofing agent 40, and the surface of the waterproofing agent is covered by the protective tube 31 is obtained.

Figure 5A:
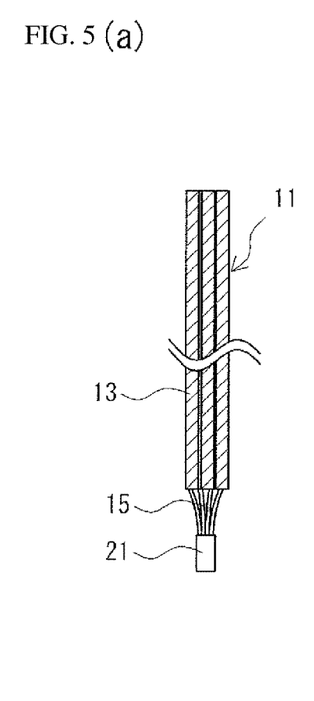
FIGS. 5(a) to 5(d) are diagrams illustrating a manufacturing method of the wire harness including the end spliced portion.
Figure 5B:
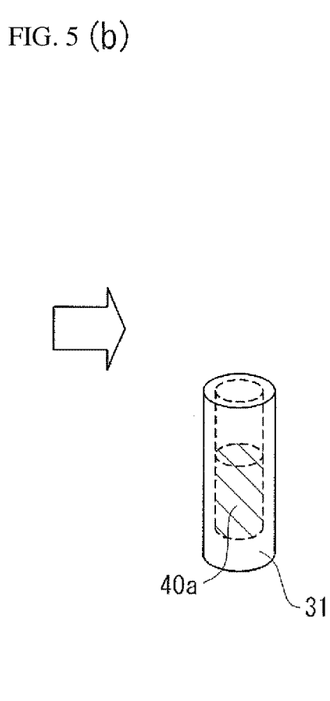
Figure 5C:
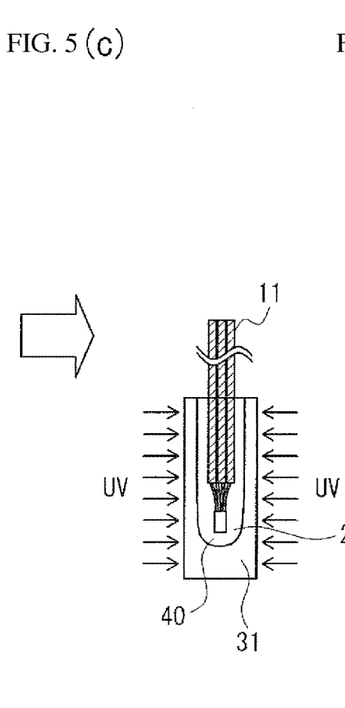
Figure 5D:
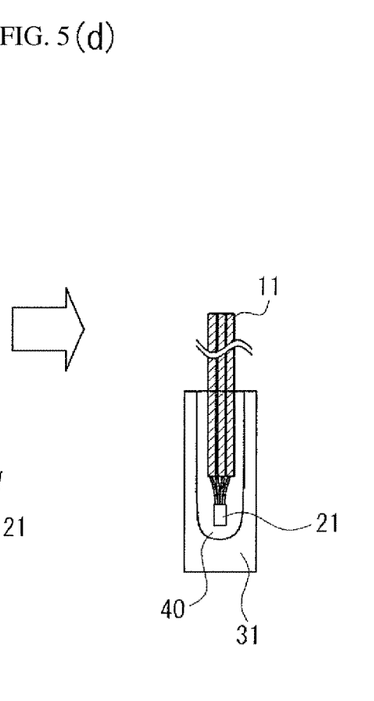

In the wire harness, the end spliced portion 21 is covered with the waterproofing agent obtained by curing the composition of the waterproofing agent that uses the above-described photo-curing material, and the protective tube 31 in contact with the waterproofing agent is formed from a resin containing a plasticizer, thus making it possible to inhibit the migration of the plasticizer of the protective tube 31 to the waterproofing agent 40.

EXAMPLES

The following describes examples according to the present invention and comparative examples. Note that the present invention is not limited by these examples.

The components of (meth)acrylate (photo-curing material) (A), a chain transfer agent (B), and a photo-polymerization initiator (C) were formulated with the compositions (parts by mass) shown in Tables 1 and 2, and the formulations were dissolved or dispersed by being mixed with a stirrer, to yield photo-curing materials of Examples 1 to 6, and Comparative Examples 1 to 5. The SP values of the photo-curing materials are shown together in Tables 1 and 2.

The abbreviations in the tables are as described below. Those without any indication of manufacturers were of reagent grade, purchased from Tokyo Chemical Industry Co., Ltd.
(A) (Meth)acrylate
  IBA: Isobornyl acrylate
  HPGA: Heptapropylene glycol diacrylate
  HPA: Hydroxypropyl diacrylate
  TEGA: Tetraethylene glycol diacrylate
  UP-1: Urethane acrylate synthesized with polypropylene glycol (synthetic product, the synthesizing method will be described later.)
  UP-2: Urethane acrylate synthesized with 1,10-decanediol (synthetic product, the synthesizing method will be described later.)

Synthesis Example 1

Synthesis of UP-1

Into a reaction vessel equipped with a stirrer, 80 g (200 mmol) of polypropylene glycol with a number-average mean molecular weight of 400, 40 g (238 mmol) of hexamethylene diisocyanate, and 0.05 g of dibutyltin dilaurate were poured, and the liquid temperature was increased from room temperature to 50° C. over one hour, under stirring. Subsequently, a small portion was sampled, and stirring was continued at 50° C., while the absorption of the isocyanate group near 2300 cm$^{-1}$ was being examined by FT-IR measurement. The amount of the residual isocyanate group contained was calculated from the absorption area of FT-IR, and the point in time at which the content was reduced to about 15% of the content before the reaction and ceased to change was regarded as the completion of the reaction, and a colorless transparent viscous liquid was obtained. Additionally, 9.84 g (84.8 mmol) of 2-hydroxyethyl acrylate, 0.05 g of dibutyltin dilaurate, and 0.02 g of pentaerythritol tetrakis[3-(3,5-di-tert-butyl-4-hydroxyphenyl)propionate] were poured, and the liquid temperature was increased from room temperature to 50° C. over one hour, under stirring. Subsequently, a small portion was sampled, and stirring was continued at 50° C. while the absorption of the isocyanate group near 2300 cm$^{-1}$ was being examined by FT-IR measurement. The amount of the residual isocyanate group contained was estimated from the absorption area of FT-IR, and the point in time at which the absorption disappeared was regarded as the completion of the reaction, and a colorless transparent viscous liquid was obtained. This was named UP-1. This is urethane acrylate having acrylates at both ends and having a polyether structure.

Synthesis Example 2

Synthesis of UP-2

Into a reaction vessel equipped with a stirrer, 35 g (200 mmol) of 1,10 decanediol with a molecular weight of 174.28, 40 g (238 mmol) of hexamethylene diisocyanate, and 0.05 g of dibutyltin dilaurate were poured, and the liquid temperature was increased from room temperature to 80° C. over one hour, under stirring. Subsequently, a small portion was sampled, and stirring was continued at 80° C., while the absorption of the isocyanate group near 2300 $cm^{-1}$ was being examined by FT-IR measurement. The amount of the residual isocyanate group contained was calculated from the absorption area of FT-IR, and the point in time at which the content was reduced to about 15% of the content before the reaction and ceased to change was regarded as the completion of the reaction, and a colorless transparent viscous liquid was obtained. Additionally, 9.84 g (84.8 mmol) of 2-hydroxyethyl acrylate, 0.05 g of dibutyltin dilaurate, and 0.02 g of pentaerythritol tetrakis[3-(3,5-di-tert-butyl-4-hydroxyphenyl)propionate] were poured, and the liquid temperature was increased from room temperature to 50° C. over one hour, under stirring. Subsequently, a small portion was sampled, and stirring was continued at 50° C. while the absorption of the isocyanate group near 2300 $cm^{-1}$ was being examined by FT-IR measurement. The amount of the residual isocyanate group contained was estimated from the absorption area of FT-IR, and the point in time at which the absorption disappeared was regarded as the completion of the reaction, and a colorless transparent viscous liquid was obtained. This was named UP-2. This is urethane acrylate having acrylates at both ends and having no polyether structure.

(B) Chain Transfer Agent

CT-1: 100 g of urethane acrylate UP-1 was heated to 50° C. while being stirred, 0.3 g of zinc acetyl acetone was added thereto as a metal-containing compound, and the whole was dispersed by stirring for 30 minutes while being maintained at 50° C.

CT-2: 0.3 g of copper acetyl acetone was used in place of zinc acetyl acetone of CT-1 described above.

CT-3: 100 g of urethane acrylate UP-2 was heated to 50° C. while being stirrred, 0.3 g of zinc acetyl acetone was added thereto as a metal-containing compound, and the mixture was dispersed by stirring for 30 minutes while being maintained at 50° C.

CT-4: 0.3 g of copper acetyl acetone was used in place of zinc acetyl acetone of CT-3 described above.

(C) Photo-Polymerization Initiator

HCHPK: 1-hydroxycyclohexyl phenyl ketone

A plasticizer migration evaluation and a non-irradiated area curability evaluation were performed for the curing materials of the examples and the comparative examples. The results of the evaluations are shown together in Tables 1 and 2. The methods of the evaluations are as follows.

Plasticizer Migration Evaluation

Tear Strength Measurement

Two 3-mm-diameter PVC resin threads containing tris(2-ethylhexyl) trimellitate (TOTM) as a plasticizer were placed parallel to each other in a state in which a covering material is in contact therewith, and each curing material was applied thereonto, and ultraviolet irradiation was performed for 25 seconds by using a UV lamp (manufactured by SEN LIGHTS CORPORATION, 100 $mW/cm^2$). Subsequently, the resin threads were stood still at room temperature for 20 minutes to be brought to room temperature, and the curing material was also applied to the backside thereof in the same manner to achieve curing, thus producing a tear testing sample. This sample was subjected to a tear test at 20 mm/min, and the tear strength was measured. The value obtained by dividing the stress applied during tearing by a half of the circumference of the PVC resin was used as the tear strength (unit: N/m). The test was performed at the time of producing the testing sample (initial), and after performing heat treatment at 120° C. for 5 days (post-heating), and the tear strengths were compared.

Plasticizer Migration Amount Measurement

The migration amount of the plasticizer was measured using FT-IR. First, several samples of curing materials in which tris(2-ethylhexyl)trimellitate (TOTM) was added as a plasticizer in predetermined amounts to the above-described synthesized urethane acrylate UP-1 were prepared. The FT-IR measurement was performed for the cured products obtained by curing the curing materials, and calibration curves representing the relationship between the plasticizer peak area and the plasticizer content were created. Based on the absorption of NH by urethane near 775 $cm^{-1}$ as a reference, the absorption of aromatic ring by TOTM near 752 $cm^{-1}$ was obtained by comparison. The FT-IR measurement was performed for the cured products, which were subjected to heat treatment at 120° C. for 5 days, used in the tear strength measurement, and the plasticizer migration amount (%) was calculated based on the above-described calibration curves.

Non-Irradiated Area Curability Evaluation

Each of the curing materials of the examples and the comparative examples was placed in a glass tube having an inside diameter of 5 mm and a height of 50 mm such that the liquid level was at a height of 20 mm, and the glass tube was wrapped with aluminum foil so as to cover the upper half (10 mm) of the content, thus forming a light-shielded portion. Subsequently, ultraviolet radiation was radiated from the side surface for 25 seconds by using a UV lamp (manufactured by SEN LIGHTS CORPORATION, 100 $mW/cm^2$). Subsequently, after the glass tube was stood still at room temperature for 20 minutes to be returned to room temperature, a 1.5-mm-diameter glass rod was inserted into the tube from above, and the distance by which the cured portion advanced from the boundary between the ultraviolet-irradiated surface and the light-shielded surface to the upper portion (non-irradiated portion) was measured by confirming the cured portion that was be able to be assessed by the finger contact.

A waterproofing performance test was performed for wire harnesses that use the materials of the examples and the comparative examples as the waterproofing agent. In the test, wire harnesses each including the waterproof intermediate spliced portion shown in FIG. 1 formed therein were produced, and their waterproofing performance was evaluated. The details of the test are as follows:

Production of Waterproof Intermediate Spliced Portion

An intermediate splice work including a polyvinyl chloride (PVC)-covered wire having an outside diameter of 4.4 mm as the main line and two PVC-covered wires having an outside diameter of 3.6 mm as the branch lines was produced. In the above-described PVC-covered wire, PVC serving as the covering material contains 20 parts by mass of tris(2-ethylhexyl) trimellitate (TOTM) as a plasticizer, relative to the whole.

Filling of Waterproofing Agent

As shown in FIG. 3(a), using a transparent wrap film made of PVC having an ultraviolet transmittance of 94% (PVC wrap film) as a protective sheet, 1.1 g of the composition of each of the curing materials of the examples and the comparative examples was applied as a waterproofing agent onto the center of the PVC wrap film, and an intermediate spliced portion of the above-described intermediate splice work was placed thereon. Subsequently, opposite ends of the PVC wrap film were attached to each other, and squeezed. Furthermore, the attached ends of the PVC wrap film were rolled up so as to form a shape covering the intermediate spliced portion and the surface of the covering material by a length of about 16 mm. The above-described PVC wrap film contained 30 parts by mass of bis(2-ethylhexyl) phthalate (DOP) as the plasticizer, relative to the whole.

Curing of Waterproofing Agent

Using an LED irradiation machine (LED-UV lamp) having a center wavelength of 385 nm, the composition of the waterproofing agent wrapped in the above-described PVC wrap film was cured by being irradiated with ultraviolet radiation so as to form a waterproof portion, thus producing a wire harness.

Evaluation of Waterproofing Performance by Pressure Test

In the pressure test, in a state in which the whole of the waterproof intermediate spliced portion of the wire harness was immersed in water, an air pressure of 200 kPa was applied for one minute from all the wires located at both ends of the harness, and the presence of air leakage was observed to evaluate the initial waterproofing performance. The evaluation criteria were such that the waterproofing performance was determined to be good (○) when there was no air leakage, and determined to be poor (×) when air leakage was observed in the process of applying an air pressure of 200 kPa for one minute. Further, the above-described pressure test was also performed for the wire harness after the whole of the waterproof intermediate spliced portion was placed in a constant-temperature bath at 120° C. and heated for 240 hours, and the post-heating waterproofing performance was evaluated. The evaluation criteria were the same as those used for the initial waterproofing performance test. The results of the waterproofing performance tests are shown together in Tables 1 and 2.

TABLE 1

| | | | Examples | | | | | |
|---|---|---|---|---|---|---|---|---|
| | | | 1 | 2 | 3 | 4 | 5 | 6 |
| Component composition | | | | | | | | |
| (Meth)acrylate | IBA | | 50 | 30 | | | | 30 |
| | HPGA | | | 20 | 20 | 20 | 20 | 20 |
| | HPA | | | | 30 | | | |
| | TEGA | | | | | 30 | | |
| | UP-1 | | | | | | 30 | |
| | UP-2 | | | | | | | |
| Chain transfer agent | CT-1 | | 50 | 50 | 50 | 50 | 50 | |
| | CT-2 | | | | | | | 50 |
| | CT-3 | | | | | | | |
| | CT-4 | | | | | | | |
| Photoinitiator | HCHPK | | 2 | 2 | 2 | 2 | 2 | 2 |
| SP value of composition | | | 9.7 | 9.5 | 10.4 | 9.8 | 10.5 | 9.5 |
| Test results | | | | | | | | |
| Plasticizer migration evaluation | Tear strength (N/m) | Initial | 110 | 102 | 96 | 120 | 108 | 103 |
| | | Post-heating | 105 | 96 | 92 | 110 | 106 | 97 |
| | Plasticizer migration amount (%) | | 4 | 5 | 3 | 5 | 5 | 5 |
| Cured distance of non-irradiated portion (mm) | | | 3.1 | 3.4 | 3.8 | 3.2 | 3.9 | 3.2 |
| Waterproofing performance | | Initial | ○ | ○ | ○ | ○ | ○ | ○ |
| | | Post-heating | ○ | ○ | ○ | ○ | ○ | ○ |

TABLE 2

| | | | Comparative Examples | | | | |
|---|---|---|---|---|---|---|---|
| | | | 1 | 2 | 3 | 4 | 5 |
| Component composition | | | | | | | |
| (Meth)acrylate | IBA | | 50 | 30 | 30 | 60 | 50 |
| | HPGA | | | 20 | 20 | | |
| | HPA | | | | | | 10 |
| | TEGA | | | | | | |
| | UP-1 | | | | | 40 | |
| | UP-2 | | | | | | 40 |
| Chain transfer agent | CT-1 | | | | | | |
| | CT-2 | | | | | | |
| | CT-3 | | 50 | 50 | | | |
| | CT-4 | | | | 50 | | |
| Photoinitiator | HCHPK | | 2 | 2 | 2 | 2 | 2 |
| SP value of composition | | | 8.9 | 8.7 | 8.7 | 9.4 | 9.1 |
| Test results | | | | | | | |
| Plasticizer migration evaluation | Tear strength (N/m) | Initial | 100 | 100 | 110 | 114 | 110 |
| | | Post-heating | 40 | 18 | 16 | 102 | 20 |
| | Plasticizer migration amount (%) | | 10 | 16 | 15 | 5 | 15 |
| Cured distance of non-irradiated portion (mm) | | | 3.0 | 3.2 | 3.3 | >0.5 | >0.5 |
| Waterproofing performance | | Initial | ○ | ○ | ○ | × | × |
| | | Post-heating | × | × | × | × | × |

As shown in Table 1, Examples 1 to 6 exhibit good tear strength both in the initial and post-heating plasticizer migration evaluations, did not experience a reduction in the post-heating strength, had a plasticizer migration amount of 5% or less, and thus can inhibit the migration of the plasticizer. In addition, the cured distance of the non-irradiated portion was 3 mm or more, and the curing of the dark area was confirmed. Also, both the initial and post-heating waterproofing performances were good. Thus, the wire harnesses of the examples inhibited the migration of the plasticizer from PVC, and enabled curing in a location where ultraviolet radiation did not reach, thus achieving a good waterproofing performance.

In contrast, as shown in Table 2, Comparative Examples 1 to 3 experienced a significant reduction in the post-heating tear strength and had a plasticizer migration amount of 10% or more in the plasticizer migration evaluation because the component (a) of the chain transfer agent did not have a polyether structure and had an SP value of less than 9.4. Comparative Example 4 has an SP value of 9.4, and was able to inhibit the migration of the plasticizer. However, it does not contain the chain transfer agent, and the non-irradiated portion remained uncured, or in other words, Comparative Example 4 does not have a dark-area curability. Comparative Example 5 had an SP value of less than 9.4, and thus was not able to inhibit the migration of the plasticizer. Accordingly, it experienced a significant reduction in the post-heating tear strength, had a plasticizer migration amount exceeding 10%, and had a poor waterproofing performance. Comparative Example 4 was able to inhibit the migration of the plasticizer, but did not have the non-irradiated area curability because it did not contain the chain transfer agent. Accordingly, Comparative Example 4 had a poor initial waterproofing performance.

Although an embodiment of the present invention has been described above in detail, the present invention is by no means limited to the above-described embodiment, and various modifications may be made without departing from the gist of the present invention.

For example, although the photo-curing materials of the above-described examples use the curing material (A) and the chain transfer agent (B), the above-described curing material (A) need not be used if the chain transfer agent (B) is a material having curability.

The wire harnesses of the above-described examples have been described, taking, as an example, a wire bundle composed of four bundled wires. However, it is only required that the wire bundle is composed of a plurality of wires, and the number of the wires used may be other than four.

The invention claimed is:

1. A cured material in contact with a resin containing a plasticizer, and cured in contact with the resin containing the plasticizer, the cured material formed from a curing material containing
at least a chain transfer agent,
wherein the chain transfer agent comprises a complex of a compound (a) containing a polyether structure and two or more urethane bonds or two or more urea bonds in a molecule and, a metal-containing compound (b),
the curing material having a solubility parameter of 9.4 or more, and,
the plasticizer is inhibited from migrating to the cured material.

2. The cured material according to claim 1,
wherein the plasticizer comprises one or more selected from a phosphonic acid ester, a sebacic acid ester, a phthalic acid ester, and an adipic acid ester that have a solubility parameter of 9.0 or less.

3. The cured material according to claim 1,
wherein the cured material is a photo-cured material, and the curing material has a dark-area curability of being susceptible to curing by the chain transfer agent in a portion that irradiation light does not reach.

4. The cured material according to claim 1,
wherein the polyether structure of the compound (a) has three or more oxygen atoms.

5. The cured material according to claim 1,
wherein the metal-containing compound (b) is a compound containing at least one metal selected from tin, copper, zinc, cobalt, and nickel.

6. The cured material according to claim 1,
wherein the resin containing the plasticizer is one selected from a polyvinyl chloride resin, an acrylic resin, a polyurethane resin, a polyolefin resin, a phenol resin, and a polyamide resin.

7. A wire harness comprising the cured material according to claim 1.

8. A wire harness including the cured material according to claim 1 as a waterproofing agent, the wire harness comprising:
a wire bundle including a plurality of bundled insulated wires each having a conductor covered with a covering material made of an insulating body, a conductor exposed portion formed by removing a part of the covering material to expose the conductor inside being covered with the waterproofing agent, and
a waterproof portion formed by covering a surface of the waterproofing agent with a light-transmissive protective member, and
the protective member being the resin containing the plasticizer, and the plasticizer of the protective member is inhibited from migrating to the waterproofing agent.

9. A wire harness manufacturing method comprising:
supplying the curing material of claim 1 to a conductor exposed portion of a wire bundle including a plurality of bundled insulated wires each having a conductor covered with a covering material made of an insulating body, the conductor exposed portion being formed by removing a part of the covering material of the wire bundle to expose the conductor inside; and
curing the curing material by irradiating light in a state in which a surface of the curing material is covered with a protective member formed from the resin containing the plasticizer and having light transmissivity, thereby forming a waterproof portion.

10. The wire harness manufacturing method according to claim 9,
wherein the protective member is a sheet or a tube formed from one selected from a polyvinyl chloride resin, an acrylic resin, a polyurethane resin, a polyolefin resin, a phenol resin, and a polyamide resin.

11. The cured material according to claim 1,
wherein the plasticizer has a solubility parameter of 9.0 or less.

12. The cured material according to claim 1,
wherein the curing material further comprises a (meth)acrylate photo-curing material.

* * * * *